US010162225B2

(12) United States Patent
Jung et al.

(10) Patent No.: US 10,162,225 B2
(45) Date of Patent: Dec. 25, 2018

(54) IMAGE CONTROLLING PANEL FOR DISPLAY DEVICE DISPLAYING ONE OF TWO DIMENSIONAL IMAGE AND THREE DIMENSIONAL STEREOSCOPIC IMAGE

(71) Applicant: SAMSUNG DISPLAY CO., LTD., Yongin, Gyeonggi-do (KR)

(72) Inventors: Kyung Ho Jung, Gyeonggi-do (KR); Kwan-Ho Kim, Gyeonggi-do (KR); Ki Yong Lee, Chungcheongnam-do (KR); Hyung Woo Yim, Gyeonggi-do (KR); Kang-Min Kim, Gyeonggi-do (KR); Jeong Min Sung, Gyeonggi-do (KR); Hyeon Yong Jang, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 662 days.

(21) Appl. No.: 14/482,500

(22) Filed: Sep. 10, 2014

(65) Prior Publication Data
US 2015/0177573 A1    Jun. 25, 2015

(30) Foreign Application Priority Data

Dec. 24, 2013 (KR) .................. 10-2013-0162972

(51) Int. Cl.
 *G09G 3/36* (2006.01)
 *G02F 1/1343* (2006.01)
 (Continued)

(52) U.S. Cl.
 CPC ....... *G02F 1/134309* (2013.01); *G02B 27/22* (2013.01); *G02F 1/13306* (2013.01);
 (Continued)

(58) Field of Classification Search
 CPC ...... G09G 3/18; G09G 3/2003–3/2081; G09G 3/36–3/3696; G09G 2300/0447–2300/0495
 See application file for complete search history.

(56) References Cited

U.S. PATENT DOCUMENTS 6,005,543 A * 12/1999 Kimura ............... G09G 3/3648
                                                                345/90
7,227,599 B2   6/2007 Sonoda et al.
(Continued)

FOREIGN PATENT DOCUMENTS

CN         1828364      9/2006
CN        101444105     5/2009
(Continued)

OTHER PUBLICATIONS

Extended European Search Report dated May 7, 2015.

*Primary Examiner* — Sanghyuk Park
(74) *Attorney, Agent, or Firm* — F. Chau & Associates, LLC

(57) ABSTRACT

An image control panel for a display device includes a first substrate and a second substrate facing each other, a lens electrode formed on the first substrate, a common electrode formed on the second substrate, and a liquid crystal layer interposed between the first substrate and the second substrate. The common electrode includes a first common electrode and a second common electrode separated from each other.

19 Claims, 16 Drawing Sheets

(51) Int. Cl.
*G02B 27/22* (2018.01)
*G02F 1/133* (2006.01)
*H04N 13/305* (2018.01)
*H04N 13/356* (2018.01)
*G02F 1/29* (2006.01)

(52) U.S. Cl.
CPC ......... *H04N 13/305* (2018.05); *H04N 13/356*
(2018.05); *G02F 2001/134318* (2013.01);
*G02F 2001/294* (2013.01)

(56) References Cited

U.S. PATENT DOCUMENTS

| | | | |
|---|---|---|---|
| 8,427,626 B2 | 4/2013 | Takahashi et al. | |
| 2010/0171775 A1* | 7/2010 | Sakamoto | G02F 1/33555 345/690 |
| 2011/0122128 A1 | 5/2011 | Akita | |
| 2011/0310320 A1 | 12/2011 | Takahashi et al. | |
| 2012/0001899 A1 | 1/2012 | Hong | |
| 2012/0062991 A1 | 3/2012 | Krijn et al. | |
| 2012/0236043 A1* | 9/2012 | Jung | G02B 27/2214 345/690 |
| 2012/0313934 A1 | 12/2012 | Akagi | |
| 2013/0094166 A1* | 4/2013 | Yokoyama | G09G 3/3666 361/784 |
| 2013/0258217 A1* | 10/2013 | Azuma | G02B 27/2214 349/15 |
| 2013/0286059 A1* | 10/2013 | Saishu | G02B 27/2214 345/698 |
| 2013/0314627 A1* | 11/2013 | Liu | G02B 27/2242 349/15 |
| 2013/0342586 A1* | 12/2013 | Kim | G02F 1/1313 345/690 |

FOREIGN PATENT DOCUMENTS

| | | |
|---|---|---|
| JP | 3083635 | 6/2000 |
| JP | 2010-078653 | 4/2010 |
| JP | 2011154197 | 8/2011 |
| JP | 2012-003072 | 1/2012 |
| JP | 2012013871 | 1/2012 |
| KR | 1020090060633 | 6/2009 |
| KR | 1020120068440 | 6/2012 |
| KR | 1020120088467 | 8/2012 |
| KR | 10-1232086 | 2/2013 |
| KR | 1020120028171 | 3/2013 |
| KR | 1020130027932 | 3/2013 |
| KR | 1020140102035 | 8/2014 |

\* cited by examiner

ND STEREOSCOPIC IMAGE

IMAGE CONTROLLING PANEL FOR DISPLAY DEVICE DISPLAYING ONE OF TWO DIMENSIONAL IMAGE AND THREE DIMENSIONAL STEREOSCOPIC IMAGE

CROSS-REFERENCE TO RELATED APPLICATION

This application claims priority under 35 U.S.C. § 119 to Korean Patent Application No. 10-2013-0162972, filed on Dec. 24, 2013 in the Korean Intellectual Property Office, the disclosure of which is incorporated by reference herein in its entirety.

TECHNICAL FIELD

The present invention relates to an image control panel for a display device.

DISCUSSION OF RELATED ART

Three-dimensional (3D) stereoscopic image display devices display a 3D image. Such stereographic image uses binocular disparity. An image that reaches a left eye and an image that reaches a right eye are displayed in the same display device, and the two images are inputted into the left eye and the right eye of an observer, respectively. Such images observed at different angles create a 3D effect on an observer.

SUMMARY

According to an exemplary embodiment of the present invention, an image control panel for a display device includes a first substrate and a second substrate facing each other, a lens electrode formed on the first substrate, a common electrode formed on the second substrate, and a liquid crystal layer interposed between the first substrate and the second substrate. The common electrode includes a first common electrode and a second common electrode separated from each other.

According to an exemplary embodiment of the present invention, a display device includes a display panel and an image control panel disposed on the display panel. The image control panel includes a first common electrode a common electrode, a lens electrode, and a liquid crystal layer interposed therebetween. The common electrode includes first and second common electrodes which are separated from each other. The lens electrode is overlapped with substantially entire surface of the first common electrode. The liquid crystal layer is interposed between the first substrate and the second substrate. The first common electrode is applied with a first common electrode voltage, the second common electrode is applied with a second common electrode voltage oscillating between a first voltage and a second voltage, and the lens electrode is supplied with a lens driving voltage oscillating between a third voltage and a fourth voltage.

BRIEF DESCRIPTION OF THE DRAWINGS

These and other features of the present invention will become more apparent by describing in detail exemplary embodiments thereof with reference to the accompanying drawings of which.

DETAILED DESCRIPTION OF EXEMPLARY EMBODIMENTS

Figure 1:
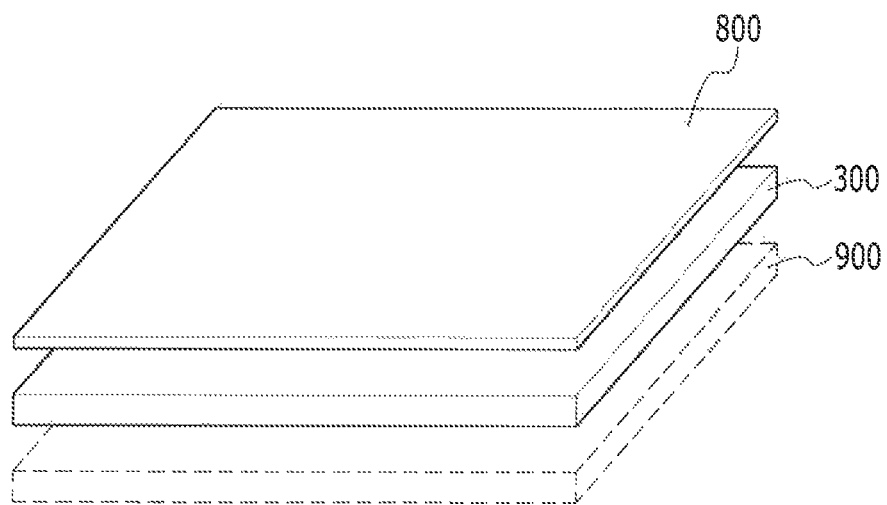
FIG. 1 is a perspective view of a display device according to an exemplary embodiment of the present invention.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

A display device according to an exemplary embodiment of the present invention will be described with reference to FIG. 1.

FIG. 1 is a perspective view of a display device according to an exemplary embodiment of the present invention.

A display device according to an exemplary embodiment of the present invention includes a display panel 300 displaying an image, an image control panel 800 controlling the image of the display panel 300 to be displayed as a 2D image or a 3D image, and a light source unit 900 supplying light to the display panel 300.

The display panel 300 as a panel displaying the image may be a liquid crystal panel, for example. However, the present invention is not limited thereto, and the display panel 300 may be one of various panels such as a plasma display panel (PDP) or an organic light emitting display (OLED) panel. The several display panels may include all display panels disclosed in the prior art. The display panel 300 displays 2D plane image.

The image control panel 800 controls the image displayed by the display panel 300 to be recognized as a 2D or a 3D stereoscopic image by a user. If the image emitted from the display panel 300 is transmitted as it is, a 2D plane image is displayed. Alternatively, if the image emitted from the display panel 100 is divided into a left-eye image and a right-eye image and a light path is changed to be respectively recognized by a left eye and a right eye, a 3D stereoscopic image is displayed. Accordingly, the image control panel 800 controls an image of the display panel 300 to be displayed in a 2D image or a 3D image, as necessary.

The light source unit 900 as a constituent element to supply light to the display panel 300 when the display panel 300 is formed of the liquid crystal panel may be omitted as necessary. For example, if the display panel 100 is a self-light-emitting device, the light source unit 900 may be omitted. The light source unit 900 may be a cold cathode fluorescent lamp (CCFL), an external electrode fluorescent lamp (EEFL), a flat fluorescent lamp (FFL), or a light emitting diode (LED).

Next, an image control panel of a display device according to an exemplary embodiment of the present invention will be described with reference FIG. 2 to FIG. 8.

Figure 2:
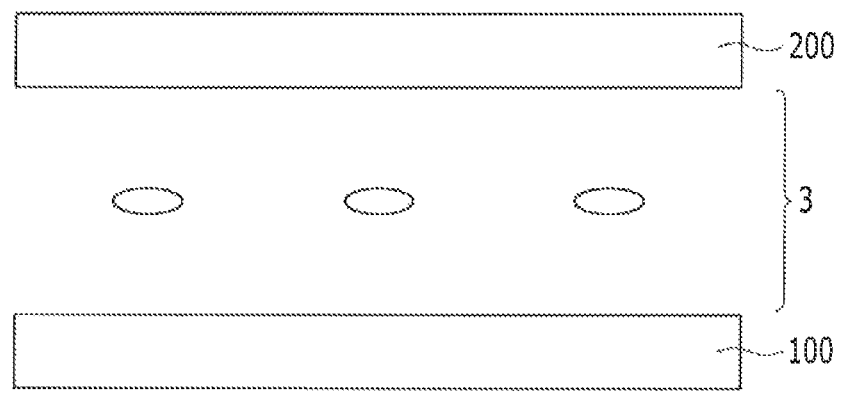
FIG. 2 is a cross-sectional view of an image control panel of a display device according to an exemplary embodiment of the present invention.
Figure 3:
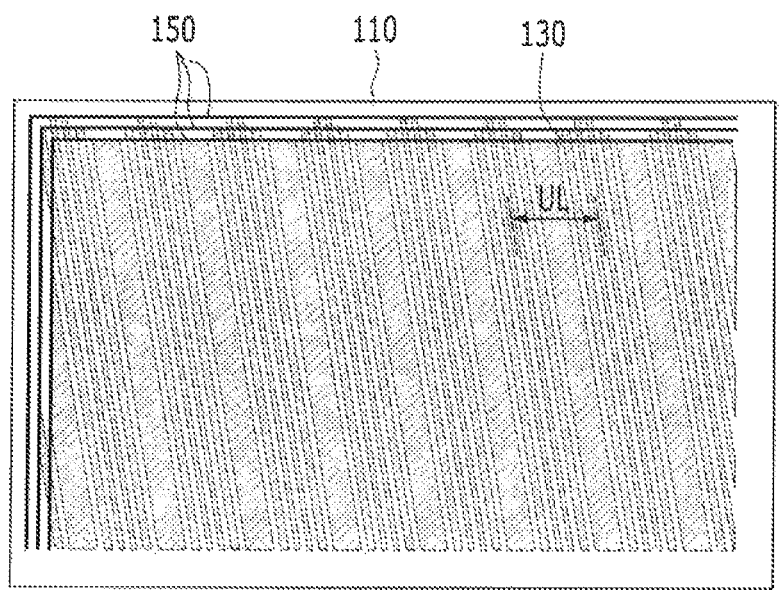
FIG. 3 is a top plan view of a first image controlling plate of an image control panel of a display device according to an exemplary embodiment of the present invention.
Figure 4:
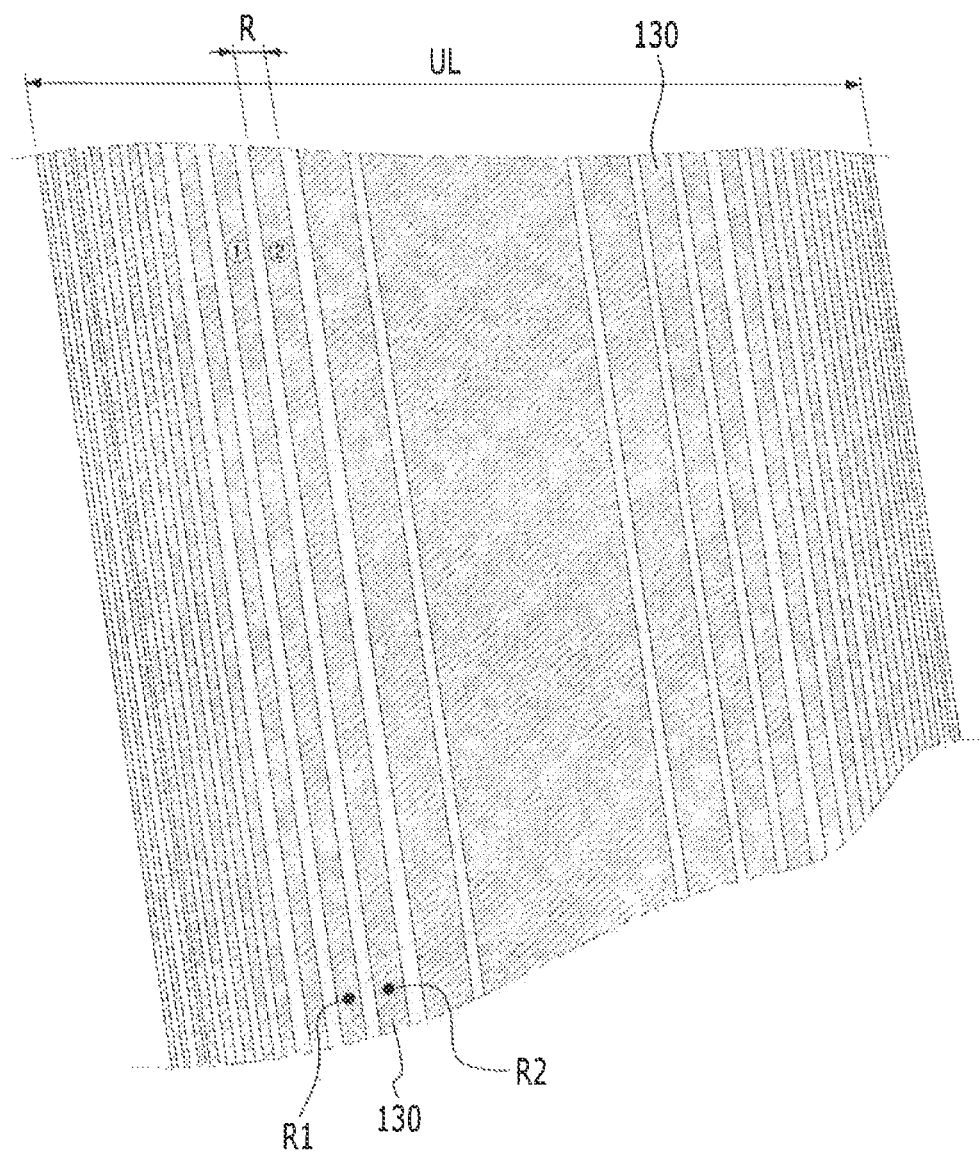
FIG. 4 is a top plan view enlarging a unit lens of FIG. 3.
Figure 5:
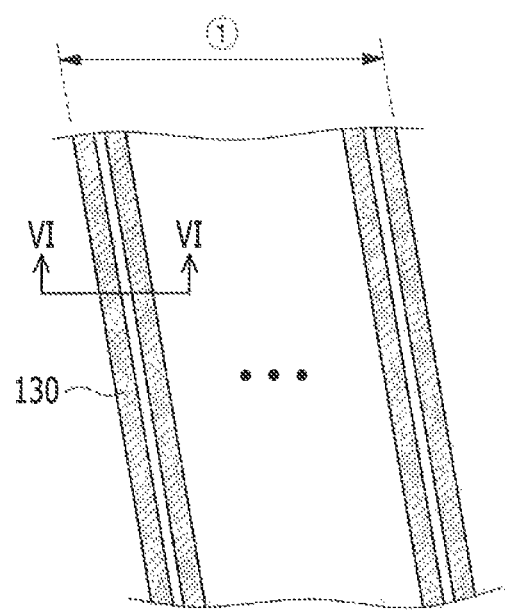
FIG. 5 is a top plan view enlarging a portion region of FIG. 4.
Figure 6:
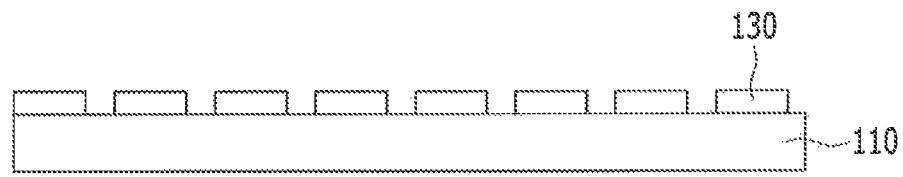
FIG. 6 is a cross-sectional view of the first image controlling plate of the image control panel of the display device of FIG. 5 taken along line VI-VI according to an exemplary embodiment of the present invention.
Figure 7:
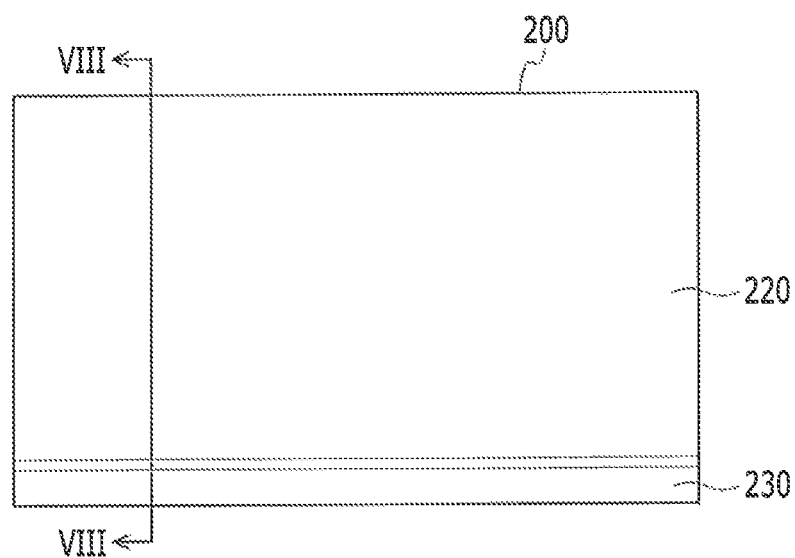
FIG. 7 is a top plan view of a second image controlling plate of an image control panel of a display device according to an exemplary embodiment of the present invention.
Figure 8:
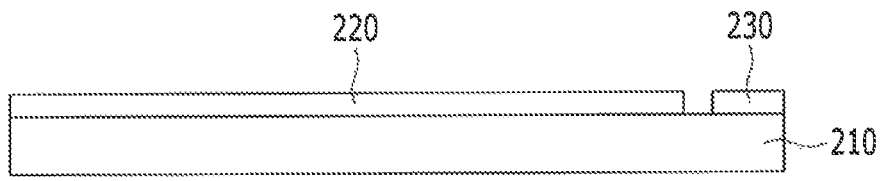
FIG. 8 is a cross-sectional view of the second image controlling plate of the image control panel of the display device of FIG. 7 taken along line VIII-VIII according to an exemplary embodiment of the present invention.

FIG. 2 is a cross-sectional view of an image control panel of a display device according to an exemplary embodiment of the present invention. FIG. 3 is a top plan view of a first image controlling plate of an image control panel of a display device according to an exemplary embodiment of the present invention. FIG. 4 is a top plan view enlarging a unit lens of FIG. 3, FIG. 5 is a top plan view enlarging a portion region of FIG. 4, and FIG. 6 is a cross-sectional view of the first image controlling plate of the image control panel of the display device of FIG. 5 taken along line VI-VI according to an exemplary embodiment of the present invention. FIG. 7 is a top plan view of a 10 second image controlling plate of an image control panel of a display device according to an exemplary embodiment of the present invention, and FIG. 8 is a cross-sectional view of the second image controlling plate of the image control panel of the display device of FIG. 7 taken along line VIII-VII according to an exemplary embodiment of the present invention.

Referring to FIG. 2, an image control panel of a display device according to an exemplary embodiment of the present invention includes a first image controlling plate 100 and a second image controlling plate 200 facing each other, and a liquid crystal layer 3 positioned between the first image controlling plate 100 and the second image controlling plate 200.

Referring to FIG. 3, the first image controlling plate 100 includes a first substrate 110, a lens electrode 130, and a lens bus line 150. The lens electrode 130 is formed on the first substrate 110.

The first substrate 110 is made of a material such as glass or plastic.

A plurality of lens electrodes 130 are formed in a group, thereby forming a unit lens UL. The plurality of unit lens UL are formed with the same shape and are disposed with a predetermined interval therebetween.

A lens bus line 150 is formed along an edge of the first substrate 110 on the first substrate 110. For example, the lens bus line 150 is formed at an upper edge and a left edge of the first substrate 110. Formation of the lens bus line 150 is not limited thereto, and it may be formed at a lower edge and a right edge of the first substrate 110 or at four edges of the first substrate 110.

The lens bus line 150 is connected to the lens electrode 130. A predetermined voltage is applied to the lens bus line 150, and the voltage applied to the lens bus line 150 is transmitted to the lens electrode 130. Accordingly, the lens electrodes 130 connected to the same lens bus line 150 are applied with the same voltage. In the drawing, the number of lens bus lines 150 is three, however the present invention is not limited thereto, and more than or less than three lens bus lines 150 may be formed.

A plurality of lens electrodes 130 forming each unit lens UL extends in an oblique direction, and as shown in FIG. 4, a plurality of zones R is formed in one unit lens UL. The plurality of zones R have different widths. For example, the zone R positioned at the center of the unit lens UL has the widest width, and smaller the width of the zone R is, closer to the edge of the unit lens UL. The left side and the right side are symmetrical with reference to an imaginary line passing through the center of the unit lens UL along the oblique direction. The number of zones R within one unit lens UL is not limited thereto, and may be more or less than the shown number of FIG. 4.

As shown in FIG. 5 and FIG. 6, each zone R includes a plurality of lens electrodes 130. The number of lens electrodes in each zone R depends on the width of each zone. Each zone R is different in width from other zones, and thus each zone R include different number of lens electrodes 130 from other zones. For example, the number of lens electrodes 130 formed in the zone R1 is different from the number of lens electrodes 130 formed in the zone R2.

The plurality of lens electrodes 130 formed in one zone R is disposed with a constant interval therebetween. The lens electrode 130 is formed to extend in a direction on the first substrate 110. For example, the lens electrode 130 may be extended in the oblique direction with respect to one edge of the first substrate 110. The lens electrode 130 may extend from one edge of the first substrate 110 to the other edge facing thereto. For example, the lens electrode 130 extends to be connected from the upper edge of the first substrate 110 to the lower edge.

FIG. 5 shows an arrangement of the lens electrode 130 within an unit lens. In FIG. 3 and FIG. 4, such arrangement of the lens electrode 130 was omitted for the convenience of a description.

The lens electrode 130 may be made of a transparent conductive material such as indium-tin oxide (ITO) and indium-zinc oxide (IZO).

A lens driving voltage is applied to each lens electrode 130. The lens driving voltage includes a lens driving voltage of a positive polarity and a lens driving voltage of a negative polarity. The lens driving voltage of the positive polarity is a higher voltage than a predetermined voltage, and the lens driving voltage of the negative polarity is a lower voltage than the predetermined voltage. The lens driving voltage of the positive polarity and the lens driving voltage of the negative polarity are alternately applied to the lens electrode 130.

As shown in FIG. 7 and FIG. 8, the second image controlling plate 200 includes a second substrate 210, a first common electrode 220 and a second common electrode 230 formed on the second substrate 210.

The first and second common electrodes 220 and 230 are separated from each other. The common electrodes 220 and 230 are formed with a plate-shaped electrode to cover substantially the entire surface of the second substrate 210. A boundary between the first common electrode 220 and the second common electrode 230 is close to one edge of the second substrate 210 and is parallel to the one edge. For example, the boundary between the first common electrode 220 and the second common electrode 230 may be close to the lower edge of the second substrate 210 and may be parallel to the lower edge.

Figure 9:
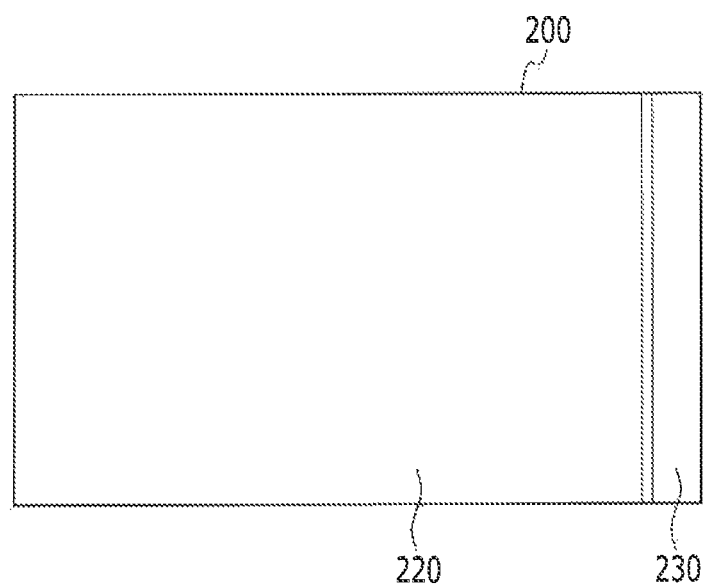
FIG. 9 and FIG. 10 are a top plan view of a second image controlling plate of an image control panel of a display device according to an exemplary embodiment of the present invention.
Figure 10:
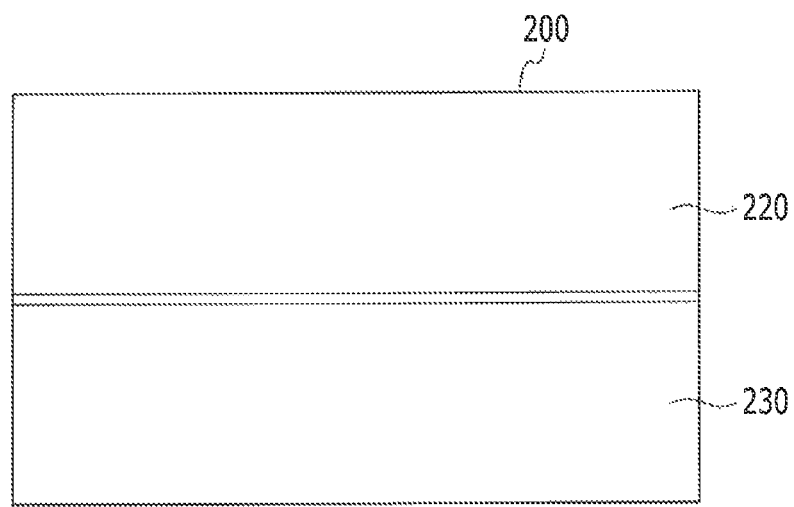

The present invention is not limited thereto, and the boundary between the first common electrode 220 and the second common electrode 230 may be formed in various positions in the substrate 210. For example, in FIG. 9, the boundary between the first common electrode 220 and the second common electrode 230 is close to a right edge of the second substrate 210 and may be parallel to the right edge. In FIG. 10, the boundary between the first common electrode 220 and the second common electrode 230 may be positioned at the center of the second substrate 210. The boundary between the first common electrode 220 and the second common electrode 230 may be parallel to the upper edge or the lower edge and may be disposed at the center between the upper edge and the lower edge of the second substrate 210.

The first common electrode 220 and the second common electrode 230 may be formed of the transparent conductive material such as indium-tin oxide (ITO) and indium-zinc oxide (IZO).

A common voltage is applied to the first common electrode 220 and the second common electrode 230. The common voltage may include a first voltage, a second voltage, and a third voltage. The first common electrode 220 may be applied with the first voltage, and the second common electrode 230 may be alternately applied with the second voltage and the third voltage. The first voltage as a predetermined voltage may serve as a reference voltage for the lens driving voltage. If the lens driving voltage is higher than the first voltage, the lens driving voltage is of the positive polarity. If the lens driving voltage is lower than the first voltage, the lens driving voltage is of the negative polarity. The second voltage may be the higher voltage than the first voltage, and the third voltage may be the lower voltage than the first voltage. For example, the second voltage and the third voltage are alternately applied to the second common electrode 230.

The liquid crystal layer 3 includes a plurality of liquid crystal molecules, and is positioned between the first substrate 110 and the second substrate 210. Accordingly, if the voltages are respectively applied to the lens electrode 130 formed on the first substrate 110 and the common electrodes 220 and 230 formed on the second substrate 210, an electric field arising from voltage difference between the lens electrode 130 and the common electrodes 220 and 230 is applied to the liquid crystal molecules of the liquid crystal layer 3.

Although not shown, an alignment layer is respectively formed on the first substrate 110 and the second substrate 210, and the alignment layer may be pretilted through a predetermined process.

Next, it will be described with reference to FIGS. 11 to 13 how the display device is driven using the lens driving voltage and common voltage.

Figure 11:
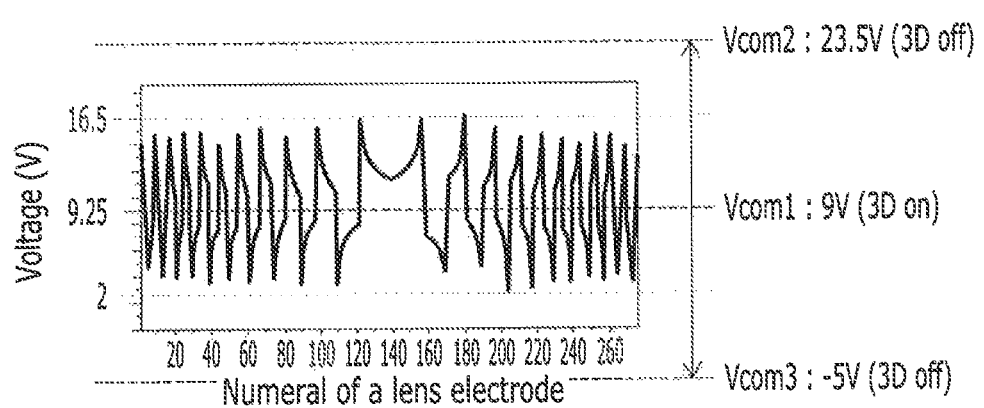
FIG. 11 is a graph of a lens driving voltage and a common voltage applied to an image control panel for a display device according to an exemplary embodiment of the present invention.
Figure 12:
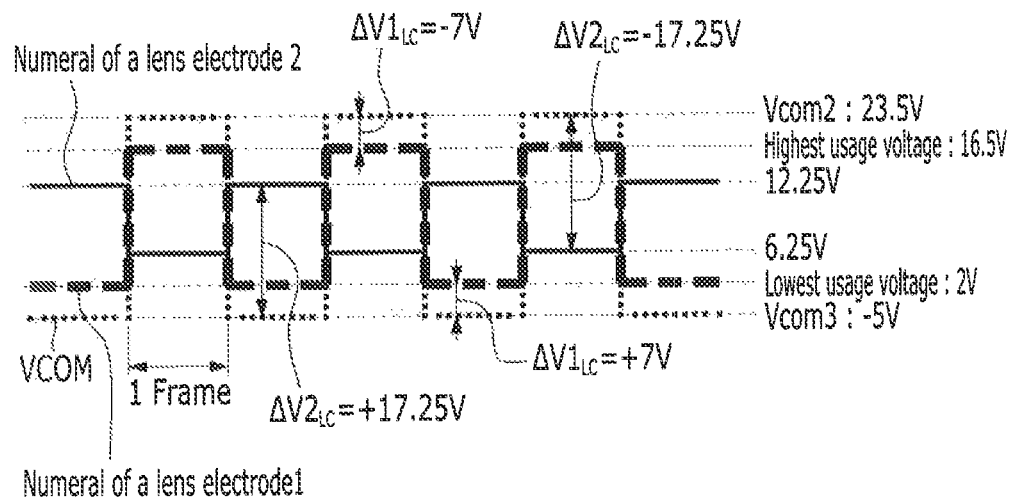
FIG. 12 and FIG. 13 are time diagrams of voltages applied to an image control panel for a display device according to an exemplary embodiment of the present invention.
Figure 13:
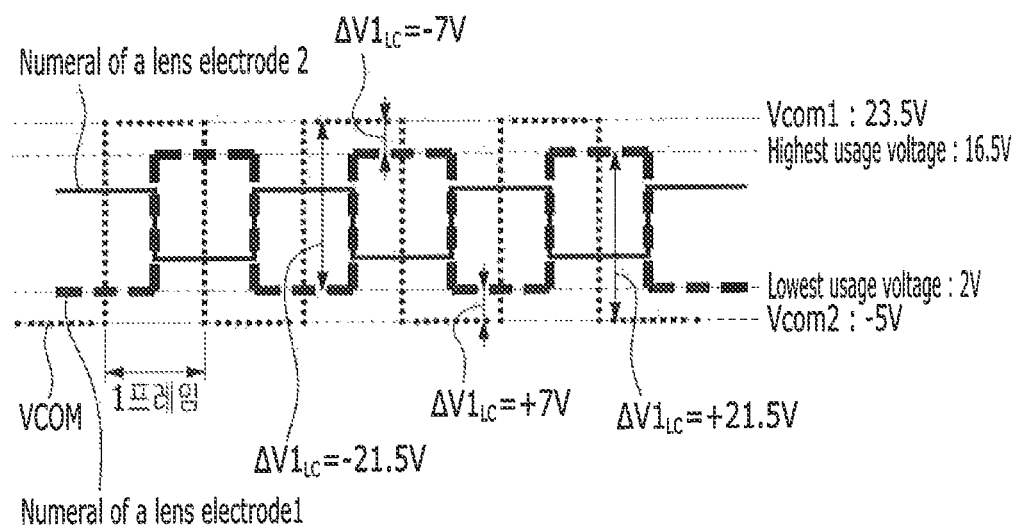

FIG. 11 is a graph of a lens driving voltage and a common voltage applied to an image control panel for a display device according to an exemplary embodiment of the present invention, and FIG. 12 and FIG. 13 are time diagrams of voltages applied to an image control panel for a display device according to an exemplary embodiment of the present invention.

In FIG. 11, the horizontal axis represents a unique number of a plurality of lens electrodes 130 included in one unit lens, and the vertical axis represents a magnitude of the voltage applied thereto. The different lens driving voltages are applied to each lens electrode 130, and the lens driving voltages is indicated by a solid line. Also, the first voltage Vcom1, the second voltage Vcom2, and the third voltage Vcom3 forming the common voltage are indicated by a dotted line.

The lens driving voltage is repeatedly increased and then decreased from the lens electrode 130 positioned at the center of one unit lens UL to both sides. At this time, a cycle of the shape in which the lens driving voltage is increased and then decreased means one zone.

The first voltage Vcom1 is between the highest lens driving voltage and the lowest lens driving voltage. For example, the first voltage Vcom1 is 9 V, and the lens driving voltage may have a value between 16.5 V and 2 V. The lens driving voltage having the voltage between 9 V and 16.5 V is referred to as the lens driving voltage of the positive polarity, and the lens driving voltage having the voltage between 2 V and 9 V is referred to as the lens driving voltage of the negative polarity.

The first common electrode 220 is constantly applied with the first voltage Vcom1, and the lens electrode 130 is applied with the lens driving voltage. For example, the lens electrode 130 that is applied with the lens driving voltage of 16.5 V in a current frame may be applied with the lens driving voltage of 2 V in a next frame. (comment: frame-by-frame 16.5-2)

If the first common electrode 220 is applied with the first voltage Vcom1 and the lens electrode 130 is applied with the lens driving voltage, the electric field formed between the first common electrode 220 and the lens electrode 130 is applied to the liquid crystal layer 3 positioned between the first common electrode 220 and the lens electrode 130, and thereby a Fresnel zone plate is formed. The Fresnel zone plate is a device serving as a lens by using diffraction of light instead of refraction of light by using a plurality of concentric circles which is radially arranged like a Fresnel zone, and have a distance between two concentric circles that is narrowed toward an outer side from a center thereof. For example, the image control panel 800 performs a function of the lens such that the image emitted from the display panel 100 is divided into a left-eye image and a right-eye image and a light path is changed to be respectively recognized by a left eye and a right eye, thereby displaying a 3D stereoscopic image.

The second voltage Vcom2 has a higher value than the maximum value of the lens driving voltage, and the third voltage Vcom3 has a lower value than the maximum value of the lens driving voltage. For example, a difference between the second voltage Vcom2 and the first voltage Vcom1 may be more than two times the rated voltage of the liquid crystal layer 3. The rated voltage means a needful voltage for driving the liquid crystal layer 3. Also, a difference between the third voltage Vcom3 and the first voltage Vcom1 may be more than two times the rated voltage of the liquid crystal layer 3. For example, when the rated voltage of the liquid crystal is 6-7 V, the second voltage Vcom2 may be 23.5 V and the third voltage Vcom3 may be −5 V.

The second common electrode 230 is alternately applied with the second voltage Vcom2 and the third voltage Vcom3. For example, if the second common electrode 230 is applied with the second voltage Vcom2 in the current frame, the second common electrode 230 is applied with the third voltage Vcom3 in the next frame.

If the second common electrode 230 is applied with the second voltage Vcom2 and the lens electrode 130 is applied with the lens driving voltage, an electric field corresponding to voltage difference between the second voltage Vcom2 and the lens driving voltage is applied to the liquid crystal layer positioned between the second common electrode 230 and the lens electrode 130, and thereby the liquid crystal molecules are approximately perpendicular with respect to the first substrate 110 or the second substrate 210. Regardless of whether the lens driving voltage is applied with any voltage, the liquid crystal layer 3 overlapped with the second common electrode 230 does not serve as a Fresnel zone plate, displaying a 2D image.

When the second common electrode 230 is applied with the third voltage Vcom3 and the lens electrode 130 is applied with the lens driving voltage, the high electric field corresponding to voltage difference between the third voltage Vcom3 and the lens driving voltage is applied to the liquid crystal layer 3 positioned between the second common electrode 230 and the lens electrode 130, and thereby the liquid crystal molecule is approximately perpendicular with respect to the first substrate 110 or the second substrate 210. Regardless of whether the lens driving voltage is applied with any voltage, the liquid crystal layer 3 overlapped with the second common electrode 230 does not serve as a Fresnel zone plate, displaying a 2D image.

For example, as shown in FIG. 12, it is assumed that the second common electrode 230 is alternately applied with the second voltage Vcom2 of 23.5 V and the third voltage Vcom3 of −5 V with a predetermined frequency. For example, a voltage applied to the second common electrode 230 oscillates between the second voltage Vcom2 and the third voltage Vcom3.

For the lens electrode 1, the lens driving voltage of the negative polarity of 2 V and the lens driving voltage of the positive polarity of 16.5 V are alternately applied to the lens electrode 1. When the lens electrode 130 is applied with the lens driving voltage of the negative polarity of 2 V, the second common electrode is applied with the third voltage Vcom3 of −5 V. The voltage difference of 7 V is applied to the liquid crystal layer 3. When the lens electrode 130 is applied with the lens driving voltage of the positive polarity of 16.5 V in the next frame, the second common electrode is applied with the second voltage Vcom2 of 23.5 V. The voltage difference of 7 V is applied to the liquid crystal layer 3. Accordingly, when the rated voltage of the liquid crystal layer 3 is 6-7 V, the electric field of 7 V is formed to the liquid crystal layer 3 such that the liquid crystal molecules stand in the perpendicular direction.

For the lens electrode 2, the lens driving voltage of the positive polarity of 12.25 V and the lens driving voltage of the negative polarity of 6.25 V are alternately applied to the lens electrode 2. When the lens driving voltage of the positive polarity of 12.25 V is applied to the lens electrode 130, the third voltage Vcom3 of −5 V is applied to the second common electrode 230. The voltage difference of 17.25 V is applied to the liquid crystal layer 3. In the next frame, the lens electrode 130 is applied with the lens driving voltage of the negative polarity of 6.25 V, the second common electrode 230 is applied with the second voltage Vcom2 of 23.5 V. The voltage difference of 17.25 V is applied to the liquid crystal layer 3. Accordingly, when the rated voltage of the liquid crystal layer 3 is 6-7 V, the electric field of 17.25 V is formed to the liquid crystal layer 3 such that the liquid crystal molecules stand in the perpendicular direction.

That is, regardless of the magnitude of the lens driving voltage applied to the lens electrode 130, the second common electrode 230 is alternately applied with the very high voltage and the very low voltage such that the high electric field is formed to the liquid crystal layer 3, thereby standing the liquid crystal molecules in the perpendicular direction. Accordingly, the image emitted from the display panel 300 is transmitted as it is, thereby displaying the 2D flat image.

According to an exemplary embodiment of the present invention, different common voltages are applied to two divided common electrodes 220 and 230 so that a partial region of the display device displays a 3D stereoscopic image and the other partial region displays a 2D image. For example, the portion corresponding to the first common electrode 220 displays the 3D stereoscopic image and the portion corresponding to the second common electrode 230 displays the 2D flat image. For example, when subtitles are displayed at the lower region which occupies about 10% of the display device, the second common electrode 230 may be designed to occupy the lower region of about 10% in the second substrate 210. Also, when subtitles are displayed at the region of about 10% of the right side in the display device, the second common electrode 230 may be designed to occupy the region of about 10% in the right side of the second substrate 210.

Here, the frequency in which the lens driving voltage of the positive polarity and the lens driving voltage of the negative polarity are applied to the lens electrode 130 and the frequency in which the second voltage and the third voltage are applied to the second common electrode 230 are the same.

In FIG. 12, a time in which the lens driving voltage of the positive polarity and the lens driving voltage of the negative polarity are applied to the lens electrode 130 and a time in which the second voltage and the third voltage are applied to the second common electrode 230 are the same. For example, the lens driving voltage may be in phase with a voltage applied to the second common electrode 230 oscillating between voltage levels of the second and third voltages Vcom2 and Vcom3.

The present invention is not limited thereto, and as shown in FIG. 13, the time in which the lens driving voltage of the positive polarity and the lens driving voltage of the negative polarity are applied to the lens electrode 130 and the time in which the second voltage and the third voltage are applied to the second common electrode 230 may be different from each other. Further, the time in which the lens driving voltage of the positive polarity and the lens driving voltage of the negative polarity are applied to the lens electrode 130 and the time in which the second voltage and the third voltage are applied to the second common electrode 230 may have a difference of half of the application cycle of the lens driving voltage of the positive polarity and the lens driving voltage of the negative polarity. For example, the lens driving voltage may be antiphase with a voltage applied to the second common electrode 230 oscillating between voltage levels of the second and third voltages Vcom2 and Vcom3.

In the case of the lens electrode 130, the lens driving voltage of the positive polarity of 12.25 V and the lens driving voltage of the negative polarity of 6.25 V are alternately applied. When the lens driving voltage of the positive polarity of 12.25V is applied to the lens electrode 130, the third voltage Vcom3 of −5 V is applied to the second common electrode 230 during a half cycle and the second voltage Vcom2 of 23.5 V is applied during the next half cycle. For the liquid crystal layer 3, the electric field corresponding to voltage difference of 17.25 V is applied to the liquid crystal layer 3 during the initial half cycle, and the electric field corresponding to voltage difference of 11.25 V is applied to the liquid crystal layer 3 during the next half cycle. Next, in the following frame, the lens driving voltage of the negative polarity of 6.25 V is applied to the lens electrode 130, the second voltage Vcom2 of 23.5 V is applied to the second common electrode 230 during the half cycle, and the third voltage Vcom3 of −5V is applied during the next half cycle. For the liquid crystal layer 3, the electric field of 17.25 V is formed during the initial half cycle and the electric field of 11.25 V is formed during the next half cycle.

For example, the difference in the application time of the lens driving voltage and the application time of the common voltage may prevent the liquid crystal layer 3 from being deteriorated.

Next, the image control panel for the display device according to an exemplary embodiment of the present invention will be described with reference to FIG. 14 to FIG. 17.

The image control panel for the display device according to an exemplary embodiment of the present invention of FIG. 14 to FIG. 17 is substantially similar to that of FIG. 1 to FIG. 8, except that the lens electrode is divided. Such difference will be described in detail.

Figure 14:
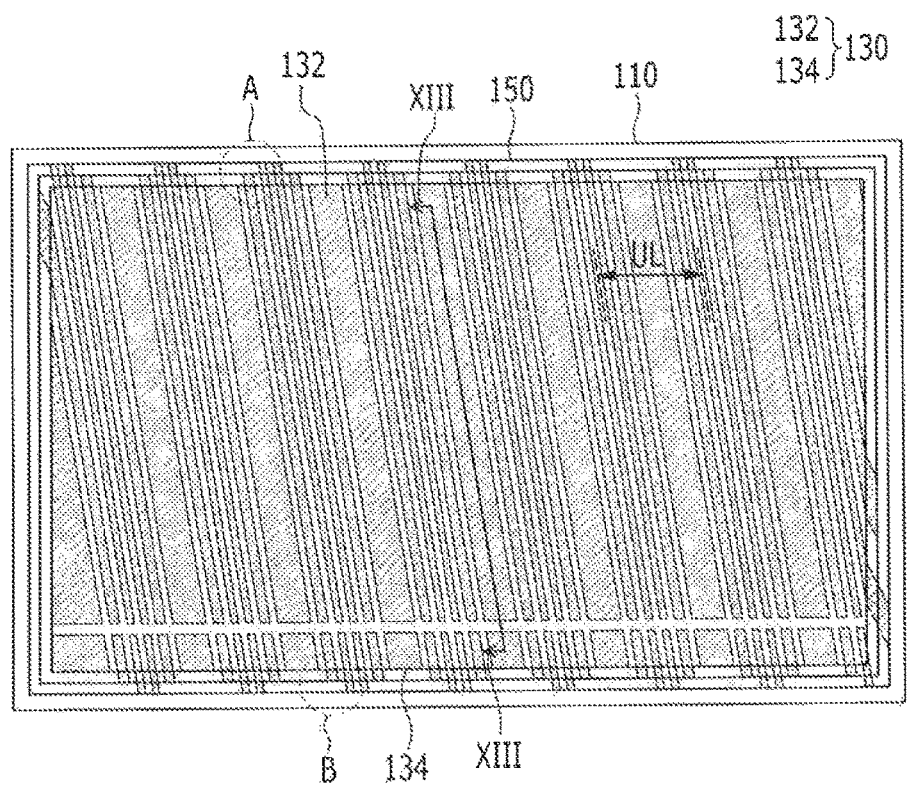
FIG. 14 is a top plan view of a first image controlling plate of an image control panel for a display device according to an exemplary embodiment of the present invention.
Figure 15:
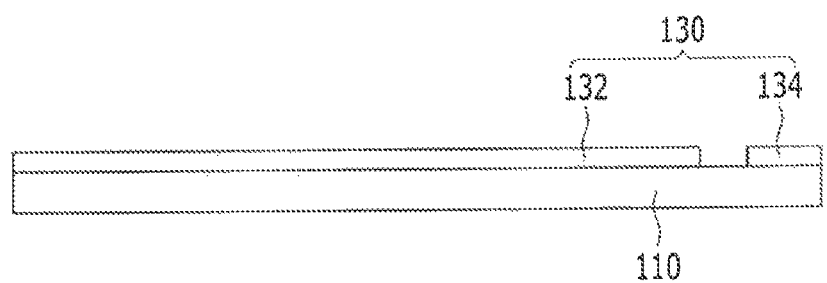
FIG. 15 is a cross-sectional view of a first image controlling plate of an image control panel for a display device taken along line XIII-XIII of FIG. 14 according to an exemplary embodiment of the present invention.
Figure 16:
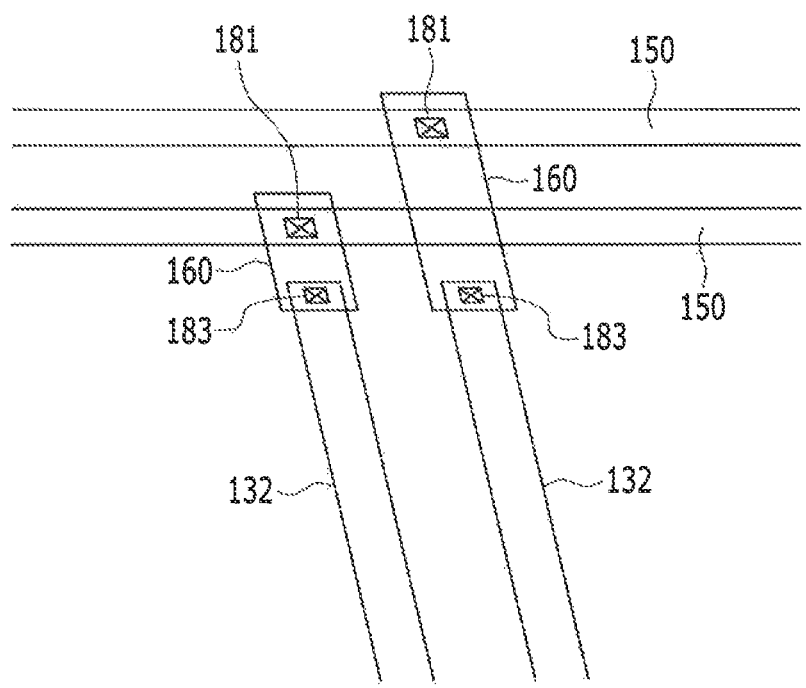
FIG. 16 is an enlarged view of a portion A of FIG. 14.
Figure 17:
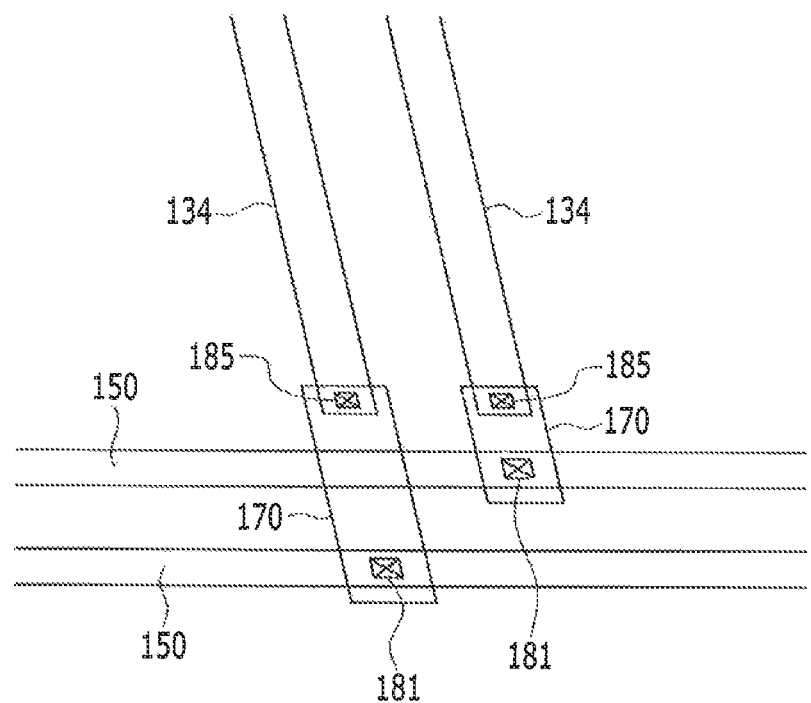
FIG. 17 is an enlarged view of a portion B of FIG. 14.

FIG. 14 is a top plan view of a first image controlling plate of an image control panel for a display device according to an exemplary embodiment of the present invention, and FIG. 15 is a cross-sectional view of a first image controlling plate of an image control panel for a display device taken along line XIII-XIII of FIG. 14 according to an exemplary embodiment of the present invention. FIG. 16 is an enlarged view of a portion A of FIG. 14, and FIG. 17 is an enlarged view of a portion B of FIG. 14.

As shown in FIG. 14 and FIG. 15, the first image controlling plate 100 of the image control panel for the display device according to an exemplary embodiment of the present invention includes a first substrate 110 and a lens electrode 130 formed on the first substrate 110.

The lens electrode 130 extends in the oblique direction with respect to one edge of the first substrate 110. The lens electrode 130 includes a first lens electrode 132 and a second lens electrode 134 that are separated from each other. The first lens electrode 132 and the second lens electrode 134 of each lens electrode 130 are positioned such that the first and second lens electrodes 132 and 134 form a straight line along the oblique direction.

The same lens driving voltage is applied to the first lens electrode 132 and the second lens electrode 134 positioned on the same line. A lens bus line 150 is formed along with the edge of the first substrate 110 on the first substrate 110. The lens bus line 150 may enclose the lens electrode 130. The lens bus line 150 is connected to the first lens electrode 132 and the second lens electrode 134 such that the first lens electrode 132 and the second lens electrode 134 may be applied with the same lens driving voltage.

An insulating layer (not shown) may be formed on the first lens electrode 132, the second lens electrode 134, and the lens bus line 150. As shown in FIG. 16 and FIG. 17, a first contact hole 181 penetrates the insulating layer, exposing the lens bus line 150, a second contact hole 183 penetrates the insulating layer, exposing the first lens electrode 132, and a third contact hole 185 penetrates the insulating layer, exposing the second lens electrode 134. A first connection electrode 160 connects the lens bus line 150 and the first lens electrode 132 using the first contact hole 181 and the second contact hole 183. Also, a second connection electrode 170 connects the lens bus line 150 and the second lens electrode 134 using the first and second contact holes 181 and 185.

For example, the first connection electrode 160 connects the first lens electrode 132 and the lens bus line 150, and the second connection electrode 170 connects the second lens electrode 134 and the lens bus line 150.

A boundary separating the first lens electrode 132 and the second lens electrode 134 is overlapped with the boundary between the first common electrode (220 of FIG. 7) and the second common electrode (230 of FIG. 7). The boundary between the first lens electrode 132 and the second lens electrode 134 is close to one edge of the first substrate 110 and is parallel to the one edge. For example, the boundary between the first lens electrode 132 and the second lens electrode 134 may be close to the lower edge of the first substrate 110 and may be parallel to the lower edge. The present invention is not limited thereto, and the boundary between the first lens electrode 132 and the second lens electrode 134 may be close to the right edge of the first substrate 110 and may be parallel to the right edge.

Next, the image control panel for the display device according to an exemplary embodiment of the present invention will be described with reference to FIG. 18.

Figure 18:
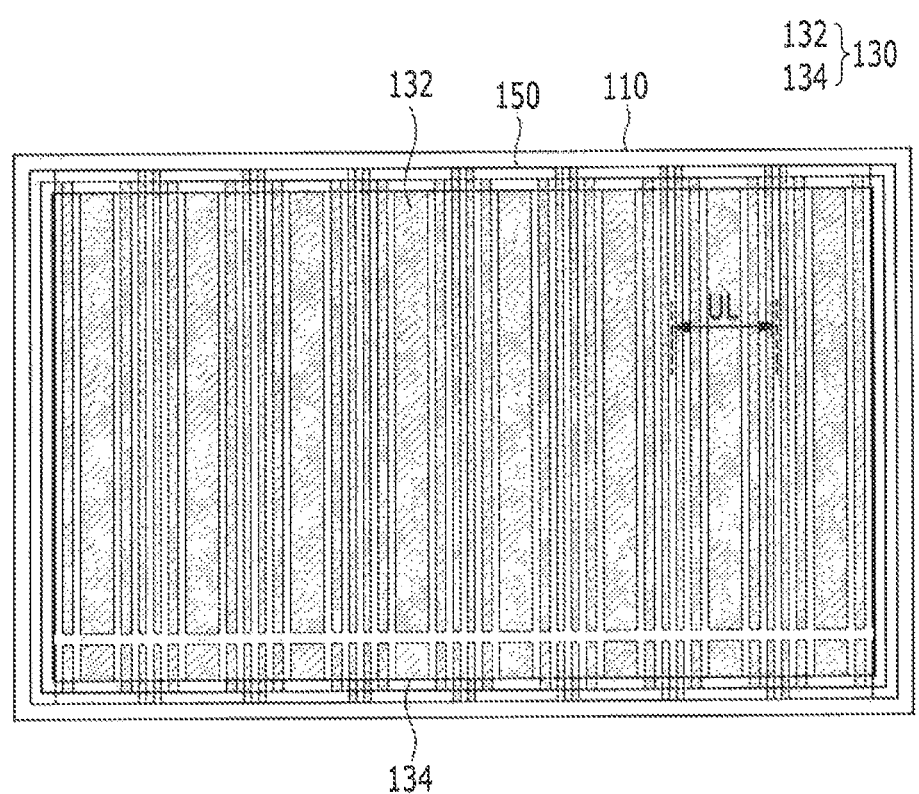
FIG. 18 is a top plan view of a first image controlling plate of an image control panel for a display device according to an exemplary embodiment of the present invention.

The image control panel for the display device according to an exemplary embodiment of the present invention of FIG. 18 is substantially similar to that of FIG. 14 to FIG. 17, except that an extending direction of the lens electrode is parallel to an edge of the first substrate 110. Such difference will be described in detail.

FIG. 18 is a top plan view of a first image controlling plate of an image control panel for a display device according to an exemplary embodiment of the present invention.

The lens electrode 130 extends in the direction parallel to one edge of the first substrate 110. For example, the lens electrode 130 extends in the direction parallel to the right edge or the left edge of the first substrate 110. Accordingly, the zone R including a plurality of lens electrodes 130 extends parallel to one edge of the first substrate 110, and the unit lens UL made of a plurality of lens electrode 130 also extends parallel to one edge of the first substrate 110.

An image control panel for a display device according to an exemplary embodiment of the present invention will be described with reference to FIG. 19.

Figure 19:
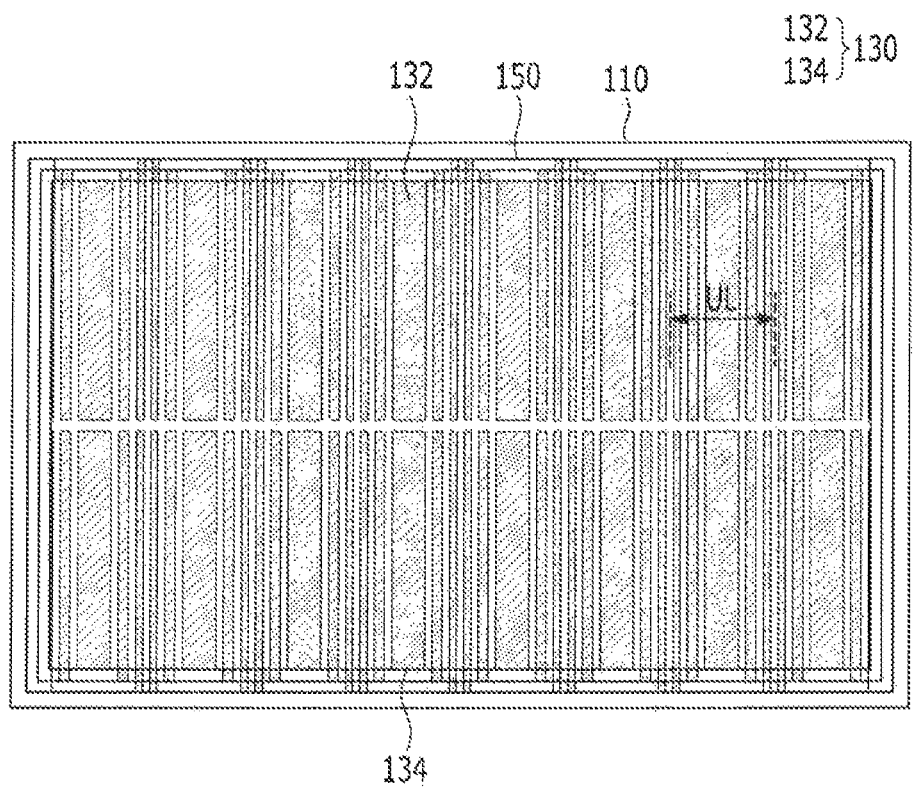
FIG. 19 is a top plan view of a first image controlling plate of an image control panel for a display device according to an exemplary embodiment of the present invention.

The image control panel for the display device of FIG. 19 is substantially similar to that of FIG. 18, except that the lens electrode is divided at the center of the first substrate 110, and such difference will be described in detail.

FIG. 19 is a top plan view of a first image controlling plate of an image control panel for a display device according to an exemplary embodiment of the present invention.

The boundary between the first lens electrode and the second lens electrode is positioned at the center of the first substrate 110, and is parallel to the upper edge or the lower edge.

The area for displaying a 2D image is substantially similar to that for displaying a 3D image.

A second image controlling plate according to an exemplary embodiment of the present invention will be described with reference to FIG. 20.

Figure 20:
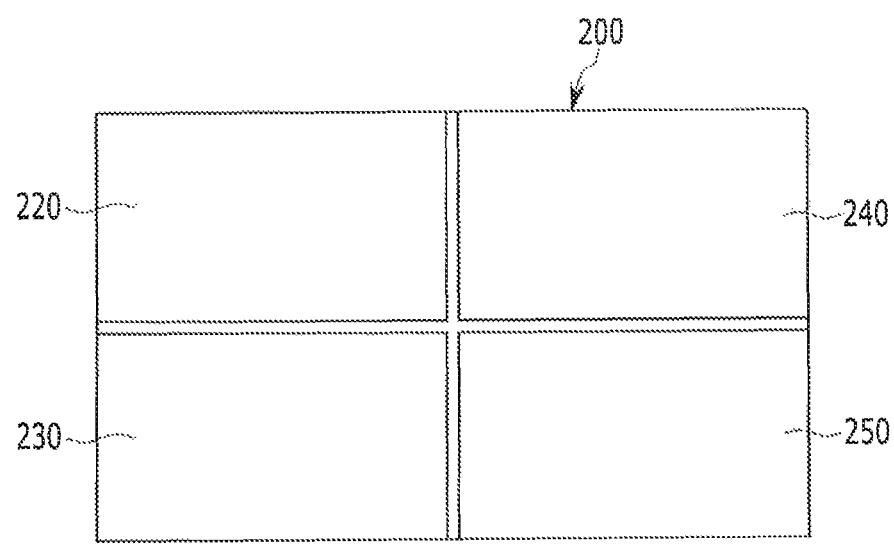
FIG. 20 is a top plan view of a second image controlling plate of an image control panel for a display device according to an exemplary embodiment of the present invention.

The second image controlling plate of FIG. 20 is substantially similar to that of FIG. 7, except that a common electrode is divided into 4 parts and such difference will be described in detail.

The second image controlling plate includes 200 includes four common electrodes 220, 230, 240, and 250 that are separated from each other.

The boundary dividing the common electrodes 220, 230, 240, and 250 into four parts may be formed of a crossed-shape, and may cross at the center of the second substrate 210.

The first common electrode 220, the second common electrode 230, the third common electrode 240, and the fourth common electrode 250 may have substantially the same area as each other. However, the present invention is not limited thereto, and the first common electrode 220, the second common electrode 230, the third common electrode 240, and the fourth common electrode 250 may have different areas from each other.

The first common electrode 220 may be constantly applied with the first voltage, and the second common electrode 230, the third common electrode 240, and the fourth common electrode 250 may be alternately applied with the second voltage and the third voltage. The region where the first common electrode 220 is positioned displays the 3D stereoscopic image, and the region where the second common electrode 230, the third common electrode 240, and the fourth common electrode 250 are positioned displays the 2D image. The present invention is not limited thereto, and the common voltage may be applied to other common electrodes 230, 240, and 250.

While the present invention has been shown and described with reference to exemplary embodiments thereof, it will be apparent to those of ordinary skill in the art that various changes in form and detail may be made therein without departing from the spirit and scope of the present invention as defined by the following claims.

What is claimed is:

1. An image control panel for a display device, comprising:
    a first substrate and a second substrate facing each other;
    a lens electrode formed on the first substrate;
    a common electrode formed the second substrate; and
    a liquid crystal layer interposed between the first substrate and the second substrate,
    wherein the common electrode includes a first common electrode and a second common electrode separated from each other,
    wherein the lens electrode includes a first lens electrode and a second lens electrode separated from each other,
    wherein the first and second lens electrodes are respectively applied with a first lens driving voltage and a second lens driving a voltage,
    wherein a first common electrode voltage applied to the first common electrode has a constant value, and a second common electrode voltage applied to the second common electrode oscillates at a first frequency,
    wherein the second common electrode voltage oscillates between a first voltage and a second voltage,
    wherein the first lens driving voltage oscillates between a third voltage and a fourth voltage,
    wherein the second lens driving voltage oscillates between a fifth voltage and a sixth voltage,
    wherein a difference between the first voltage of the second common electrode voltage and the third voltage of the first lens driving voltage is substantially a same as a difference between the second voltage of the second common electrode voltage and the fourth voltage of the first lens driving voltage, and
    wherein a difference between the first voltage of the second common electrode voltage and the fifth voltage of the second lens driving voltage is substantially a same as a difference between the second voltage of the second common electrode voltage and the sixth voltage of the second lens driving voltage.

2. The image control panel of claim 1,
    wherein the first common electrode voltage is a constant value, and the constant value is between voltage levels of the first and second voltages in the second common electrode voltage.

3. The image control panel of claim 2,
    wherein a difference of the constant value of the first common electrode voltage and the first voltage of the second common electrode voltage is more than two times a rated voltage of the liquid crystal layer.

4. The image control panel of claim 3,
    wherein a difference of the constant value of the first common electrode voltage and the second voltage of the second common electrode voltage is more than two times the rated voltage of the liquid crystal layer.

5. The image control panel of claim 2,
    wherein a first boundary divides the common electrode into the first and second common electrodes,
    wherein the first boundary is disposed between two facing edges of the second substrate, and
    wherein the first boundary is extended in parallel to one of the two facing edges.

6. The image control panel of claim 5,
    wherein the first boundary is closer to one of the two facing edges than the other of the two facing edges.

7. The image control panel of claim 5,
    wherein the first boundary is at a center of the two facing edges.

8. The image control panel of claim 2,
    wherein the first lens driving voltage and the second lens driving voltage oscillate between a negative polarity and a positive polarity.

9. The image control panel claim 8,
    wherein the first lens driving voltage or the second lens driving voltage is in phase with the second common electrode voltage.

10. The image control panel of claim 8,
    wherein the lens driving voltage is antiphase with the second common electrode voltage.

11. The image control panel of claim 5,
    wherein the first lens electrode and the second lens electrode are separated from each other with a second boundary.

12. The image control and of claim 11, further comprising:
    a lens bus line formed on the first substrate, wherein the lens bus line is connected to a first end of the lens electrode or a second end of the lens electrode.

13. The image control panel of claim 11,
wherein the second boundary between the first lens electrode and the second lens electrode is overlapped with the first boundary between the first common electrode and the second common electrode.

14. The image control panel of claim 13,
wherein the second boundary between the first lens electrode and the second lens electrode is positioned at substantially the center of the first substrate.

15. The image control panel of claim 1,
wherein the common electrode further includes a third common electrode and a fourth common electrode.

16. A display device, comprising:
a display panel; and
an image control panel disposed on the display panel,
wherein the image control panel comprises:
a common electrode including first and second common electrodes which are separate from each other;
a lens electrode overlapped with the common electrode, wherein the lens electrode includes a first lens electrode and a second lens electrode separated from each other, and wherein the first and second lens electrodes are respectively applied with a first lens driving voltage and a second driving voltage;
a lens bus line connected to an end of the first lens electrode or an end of the second lens electrode;
a liquid crystal layer interposed between the first substrate and the second substrate,
wherein the first common electrode is applied with a first common electrode voltage, the second common electrode is applied with a second common electrode voltage oscillating between a first voltage and a second voltage, the first lens electrode is supplied with a first lens driving voltage oscillating between a third voltage and a fourth voltage, the second lens electrode is supplied with a second lens driving voltage oscillating between a fifth voltage and a sixth voltage,
wherein a difference between the first voltage of the second common electrode voltage and the third voltage of the first lens driving voltage is substantially a same as a difference between the second voltage of the second common electrode voltage and the fourth voltage of the first lens driving voltage, and
wherein a difference between the first voltage of the second common electrode voltage and the fifth voltage of the second lens driving voltage is substantially a same as a difference between the second voltage of the second common electrode voltage and the sixth voltage of the second lens driving voltage.

17. The display device of claim 16,
wherein the first lens driving voltage or the second lens driving voltage is in phase with the second common electrode voltage.

18. The display device of claim 16,
wherein the first lens driving voltage or the second lens driving voltage is antiphase with the second common electrode voltage.

19. An image control panel for a display device, comprising:
a first substrate and a second substrate facing each other;
a lens bus line formed on the first substrate, wherein the lens bus line includes a first lens bus line part and a second lens pus line part in parallel to the first lens bus line part;
a lens electrode formed on the first substrate,
wherein the lens electrode includes a first lens electrode connected to the first lens line part and a second lens electrode connected to the second lens bus line part,
wherein the first lens electrode and the second lens electrode are separated from each other and
wherein the first and second lens electrodes are respectively applied with a first lens driving voltage and a second lens driving voltage through the lens bus line;
a common electrode formed on the second substrate and including first and second common electrodes which are separate from each other; and
a liquid crystal layer interposed between the first substrate and the second substrate,
wherein the first common electrode is applied with a first common electrode voltage, the second common electrode is applied with a second common electrode voltage oscillating between a first voltage and a second voltage, the first lens electrode is supplied with a first lens driving voltage oscillating between a third voltage and a fourth voltage, the second lens electrode is supplied with a second lens driving voltage oscillating between a fifth voltage and a sixth voltage,
wherein a difference between the first voltage of the second common electrode voltage and the third voltage of the first lens driving voltage is substantially a same as a difference between the second voltage of the second common electrode voltage and the fourth voltage of the first lens driving voltage, and
wherein a difference between the first voltage of the second common electrode voltage and the fifth voltage of the second lens driving voltage is substantially a same as a difference between the second voltage of the second common electrode voltage and the sixth voltage of the second lens driving voltage.

* * * * *